(12) United States Patent
Wichman et al.

(10) Patent No.: US 7,079,147 B2
(45) Date of Patent: Jul. 18, 2006

(54) SYSTEM AND METHOD FOR COOPERATIVE OPERATION OF A PROCESSOR AND COPROCESSOR

(75) Inventors: Shannon A. Wichman, McKinney, TX (US); Ramon C. Trombetta, Garland, TX (US); Yetung P. Chiang, Richardson, TX (US)

(73) Assignee: LSI Logic Corporation, Milpitas, CA (US)

( * ) Notice: Subject to any disclaimer, the term of this patent is extended or adjusted under 35 U.S.C. 154(b) by 219 days.

(21) Appl. No.: 10/437,485

(22) Filed: May 14, 2003

(65) Prior Publication Data

US 2004/0227763 A1    Nov. 18, 2004

(51) Int. Cl.
 G06F 15/16 (2006.01)
 G06F 13/14 (2006.01)
 G06F 15/76 (2006.01)
 G06F 9/40 (2006.01)
 G06T 1/00 (2006.01)
 G06K 9/46 (2006.01)

(52) U.S. Cl. ............... 345/503; 345/520; 345/522; 362/336; 712/34; 712/203

(58) Field of Classification Search ............... 345/501, 345/503, 520, 522, 559; 375/240.16, 240.17, 375/240.24; 382/232, 236; 712/34, 203, 712/209; 725/105, 135
See application file for complete search history.

(56) References Cited

U.S. PATENT DOCUMENTS

| | | | |
|---|---|---|---|
| 4,942,519 A | 7/1990 | Nakayama | |
| 5,237,322 A | 8/1993 | Heberle | |
| 5,327,121 A | 7/1994 | Antles, II | |
| 5,469,544 A | 11/1995 | Aatresh et al. | |
| 5,555,425 A | 9/1996 | Zeller | |
| 5,699,460 A * | 12/1997 | Kopet et al. | 382/307 |
| 5,729,703 A | 3/1998 | Onn et al. | |
| 6,044,453 A * | 3/2000 | Paver | 712/201 |
| 6,081,860 A | 6/2000 | Bridges et al. | |
| 6,256,693 B1 | 7/2001 | Platko | |
| 6,772,254 B1 | 8/2004 | Hofmann et al. | |
| 6,865,663 B1 * | 3/2005 | Barry | 712/34 |
| 2001/0025297 A1 * | 9/2001 | Kim et al. | 709/203 |
| 2002/0114395 A1 * | 8/2002 | Owen et al. | 375/240.18 |
| 2003/0174252 A1 * | 9/2003 | Bellas et al. | 348/699 |
| 2004/0098563 A1 * | 5/2004 | Parthasarathy et al. | 712/34 |
| 2004/0215444 A1 * | 10/2004 | Patel et al. | 704/2 |

* cited by examiner

*Primary Examiner*—Kee M. Tung
*Assistant Examiner*—Aaron M. Richer
(74) *Attorney, Agent, or Firm*—Hitt Gaines, P.C.

(57) ABSTRACT

A disclosed coprocessor receives a user-defined command during execution of an instruction including the user-defined command, and performs a predetermined function in response to the user-defined command. The user-defined command includes multiple ordered bits having values assigned by a user. In one embodiment, the coprocessor includes logic coupled to receive the user-defined command and a datapath. The logic produces a control value in response to the user-defined command. The datapath receives data and the control value, and performs the predetermined function dependent upon the control value. In one embodiment, the predetermined function is a motion estimation function. Data processing systems are described including a processor coupled to the coprocessor. Another disclosed data processing system includes an arbiter coupled between a processor and multiple coprocessors. The arbiter receives the user-defined command, and provides the user-defined command to one of the coprocessors dependent upon the user-defined command.

18 Claims, 9 Drawing Sheets

| OPCODE FIELD 402 | DESTINATION REGSITER FIELD 404 | SOURCE REG. 1 FIELD 406 | SOURCE REG. 2 FIELD 408 | | USER COMMAND FIELD 410 |
|---|---|---|---|---|---|
| 31    20 19 | 17 16 | 14 13 | 11 10 | 8 7 | 0 |

| OPCODE FIELD 412 | SOURCE/ DEST. REG. FIELD 414 | SOURCE REGISTER FIELD 416 | USER COMMAND FIELD 418 |
|---|---|---|---|
| 31    22 21 | 19 18 | 16 15 | 0 |

| OPCODE FIELD 420 | DESTINATION REGSITER FIELD 422 | USER COMMAND FIELD 424 |
|---|---|---|
| 31    16 15 | | 0 |

| OPCODE FIELD 502 | SOURCE REG. 1 FIELD 504 | SOURCE REG. 2 FIELD 506 | USER COMMAND FIELD 508 |
|---|---|---|---|
| 31  22 | 21  19 | 18  16 | 15  0 |

| OPCODE FIELD 510 | SOURCE REGISTER FIELD 512 | | USER COMMAND FIELD 514 |
|---|---|---|---|
| 31  22 | 21  19 | 18  16 | 15  0 |

| OPCODE FIELD 516 | USER COMMAND FIELD 518 |
|---|---|
| 31 | 16  15  0 |

↙ 112

SYSTEM AND METHOD FOR COOPERATIVE OPERATION OF A PROCESSOR AND COPROCESSOR

FIELD OF THE INVENTION

This invention relates generally to data processing systems and, more particularly, to data processing systems including coprocessors.

BACKGROUND OF THE INVENTION

In data processing systems, a coprocessor is generally a special purpose processing unit that assists a processor in performing certain types of operations, particularly computationally demanding operations. For example, a data processing system may include a processor coupled to a math (numeric) coprocessor, wherein the math coprocessor performs certain mathematical computations, particularly floating-point operations. In addition to math coprocessors, graphics coprocessors for manipulating graphic images are also common.

In known data processing systems including processors coupled to coprocessors, the processor executes instructions from one instruction set (i.e., processor instructions of a processor instruction set), and the coprocessor executes instructions from another instruction set (i.e., coprocessor instructions of a coprocessor instruction set). Due to the special purpose nature of coprocessors, the processor and coprocessor instruction sets typically differ substantially, and are defined by manufacturers of the processor and coprocessor, respectively.

To take advantage of the coprocessor, software programs must be written to include coprocessor instructions of the coprocessor instruction set. When the processor is executing instructions of a software program and encounters a coprocessor instruction, the processor issues the coprocessor instruction to the coprocessor. The coprocessor executes the coprocessor instruction, and typically returns a result to the processor.

In order for coprocessor manufacturers to sell many units, commercially available coprocessors typically perform operations needed by a large group of data processing system users. However, it is believed that data processing system users also want coprocessors that perform one or more operations that commercially available coprocessors do not perform, or coprocessors that perform specific operations in particular ways.

For example, in a video telephone (videophone) application, it may be advantageous to have a coprocessor that performs certain MPEG-4 coder/decoder (codec) functions in particular ways. MPEG-4 is an International Standards Organisation/International Electro technical Commission (ISO/IEC) video and audio data compression standard developed by the Moving Picture Experts Group (MPEG). The MPEG-4 standard provides a set of tools and technologies enabling the integration of the production, distribution, and content access paradigms in such applications as digital TV, interactive graphics, and interactive multimedia. With its robustness, high quality and low bit rate, MPEG-4 video compression has already found its way into wireless telephones, personal digital assistants (PDAs), digital cameras, Internet Web pages, etc.

The wide range of tools offered by the MPEG-4 standard allows the decoding and representation of natural video, still images, and synthetic graphics objects. For a specific area of application, the standard depends on profiles and levels to narrow down syntax and semantics subsets, respectively. The 9 visual profiles defined in version 1.0 of the MPEG-4 standard are: simple, simple scalable, core, main, n-bit, simple facial animation, scalable texture, basic animated 2D texture, and hybrid. In version 2.0, another 6 profiles were added: advanced real-time simple, core scalable, advanced coding efficiency, advanced scalable texture, advanced core, simple face and body animation. Of these 16 profiles, half of them are for natural video and the other half are for synthetic/natural hybrid visual content.

The simple profile, which is backward compatible to the existing video conferencing standard H.263, has been dubbed by many as the video standard for wireless videophone applications. The simple profile supports the basic tools for intra and predictive pictures, error resilience, and short header. The simple profile only operates on rectangular blocks, and does not include arbitrary shape coding. The 4 levels within the simple profile vary between picture size, frame rate, buffer size, bit rate, and video packet length.

SUMMARY OF THE INVENTION

A coprocessor is disclosed that receives a user-defined command during execution of an instruction including the user-defined command, and performs a predetermined function in response to the user-defined command. The user-defined command includes multiple ordered bits having values assigned by a user. In one embodiment, the coprocessor includes logic coupled to receive the user-defined command and a datapath. The logic produces a control value in response to the user-defined command. The datapath receives data corresponding to the user-defined command and the control value, and performs the predetermined function dependent upon the control value. In one embodiment, the predetermined function is a motion estimation function.

Data processing systems are described including a processor coupled to the coprocessor. The processor executes the instruction including the user-defined command, and provides the user-defined command to the coprocessor during execution of the instruction.

A data processing system is described including an arbiter coupled between the processor and multiple coprocessors. The processor provides the user-defined command to the arbiter during execution of the instruction. The arbiter receives the user-defined command, and provides the user-defined command to one of the coprocessors dependent upon the user-defined command.

BRIEF DESCRIPTION OF THE DRAWINGS

The invention may be understood by reference to the following description taken in conjunction with the accompanying drawings, in which like reference numerals identify similar elements, and in which:

FIGS. 4A–5C are diagrams of different embodiments of the coprocessor instruction of FIG. 1;

DETAILED DESCRIPTION OF THE PREFERRED EMBODIMENTS

In the following disclosure, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art. It is further noted that all functions described herein may be performed in either hardware or software, or a combination thereof, unless indicated otherwise. Certain terms are used throughout the following description and claims to refer to particular system components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical or communicative connection. Thus, if a first device couples to a second device, that connection may be through a direct connection, or through an indirect connection via other devices and connections.

Figure 1:
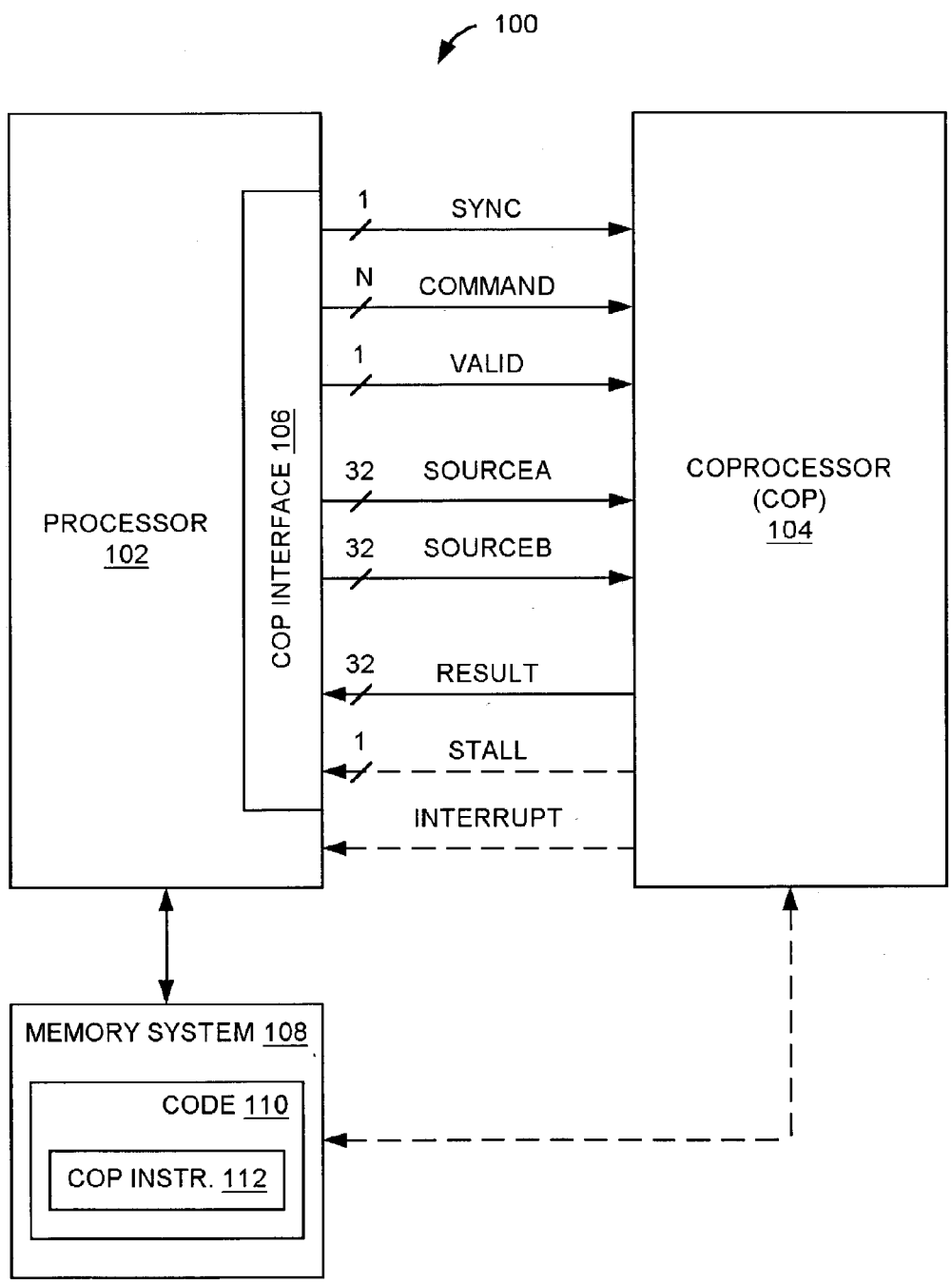
FIG. 1 is a diagram of one embodiment of a data processing system including a processor coupled to, and in communication with, a coprocessor, wherein the processor is coupled to a memory system storing a software program (i.e., code) including a coprocessor instruction.

FIG. 1 is a diagram of one embodiment of a data processing system 100 including a processor 102 coupled to, and in communication with, a coprocessor 104. In general, the processor 102 and the coprocessor 104 cooperate to achieve a desired result. For example, as described in detail below, the coprocessor 104 may extend or augment a computational capability of the processor 102. Alternately, or in addition, steps of a computational algorithm may be divided among the processor 102 and the coprocessor 104. For example, computationally demanding steps of an algorithm may be assigned to the coprocessor 104, relieving the processor 102 of the need to perform the computationally demanding steps. In many cases, a performance of the data processing system 100 including the processor 102 and the coprocessor 104 exceeds a performance of the processor 102 alone.

In the embodiment of FIG. 1, the processor 102 includes a coprocessor interface 106 adapted for coupling to, and communicating with, the coprocessor 104. In the embodiment of FIG. 1, the processor 102 and the coprocessor 104 communicate via several signals, including a 1-bit "SYNC" signal, an n-bit "COMMAND" signal (n>1), a 1-bit "VALID" signal, a 32-bit "SOURCEA" signal, a 32-bit "SOURCEB" signal, a 32-bit "RESULT" signal.

In general, the SYNC signal indicates whether the processor 102 expects the coprocessor 104 to produce a result, and to provide the result via the RESULT signal, within a certain amount of time. The n-bit COMMAND signal specifies an n-bit, user-defined command, and is provided by the processor 102 and the coprocessor 104. The user-defined command includes multiple ordered bits, wherein the values of the bits are assigned by a user. In general, the coprocessor 104 is configured to interpret the user-defined command specified by the n-bit COMMAND signal, and to perform a corresponding function. Performance of the corresponding function may, for example, produce the result.

The VALID signal indicates whether the n-bit COMMAND signal is valid. The 32-bit SOURCEA and SOURCEB signals convey data from the processor 102 to the coprocessor 104. For example, in response to a valid n-bit COMMAND signal, the coprocessor 104 may perform a function on data conveyed by the 32-bit SOURCEA and SOURCEB signals, thereby producing a result. The RESULT signal is used to convey a result produced by the coprocessor 104 to the processor 102.

In the embodiment of FIG. 1, the coprocessor interface 106 of the processor 102 generates the SYNC signal, the n-bit COMMAND signal, the VALID signal, and the SOURCEA and SOURCEB signals, and receives the RESULT signal from the coprocessor 104.

As indicated in FIG. 1, the coprocessor 104 may also produce a 1-bit "STALL" signal received by the processor 102. The coprocessor 104 may assert the STALL signal when a previous SYNC signal indicated the processor 102 expects the coprocessor 104 to provide a result via the RESULT signal within a certain amount of time, and the coprocessor 104 is not able to provide the result within the allotted amount of time. In this situation, the coprocessor 104 may continue to assert the STALL signal until the result is produced. As indicated in FIG. 1, the processor 102 receives the STALL signal via the coprocessor interface 106.

In the embodiment of FIG. 1, the processor 102 is coupled to a memory system 108. In general, the processor 102 fetches and executes instructions of a predefined instruction set stored in the memory system 108. As illustrated in FIG. 1, the memory system 108 includes a software program (i.e., code) 110 including instructions from the instruction set. The code 110 includes a coprocessor (COP) instruction 112 of the instruction set.

As described in detail below, the coprocessor instruction 112 includes a user-defined command directed to the coprocessor 104. The user-defined command includes multiple ordered bits having values assigned by the user. During execution of the coprocessor instruction 112, the processor 102 provides the user-defined command to the coprocessor 104. In response to the user-defined command, the coprocessor 104 performs a predetermined function.

In "tightly coupled" embodiments of the data processing system 100 described below, the coprocessor 104 may depend on the processor 102 to access the memory system 108 and to provide data from the memory system 108 to the coprocessor 104. In other "loosely coupled" embodiments of the data processing system 100 described below, the coprocessor 104 may be coupled to the memory system 108 as indicated in FIG. 1, and may access the memory system 108 directly.

In the loosely coupled embodiments of the data processing system 100, the processor 102 typically does not expect the coprocessor 104 to produce a result within a certain amount of time. In this situation, the coprocessor 104 may assert an "INTERRUPT" signal when the coprocessor 104 produces the result. In response to the INTERRUPT signal, the processor 102 may obtain the result from the coprocessor 104 (e.g., via the RESULT signal) as described in detail below.

The processor 102 may be, for example, one of several functional blocks or units (i.e., "cores") formed on an integrated circuit. It is now possible for integrated circuit designers to take highly complex functional units or blocks, such as processors, and integrate them into an integrated circuit much like other less complex building blocks.

Figure 2:
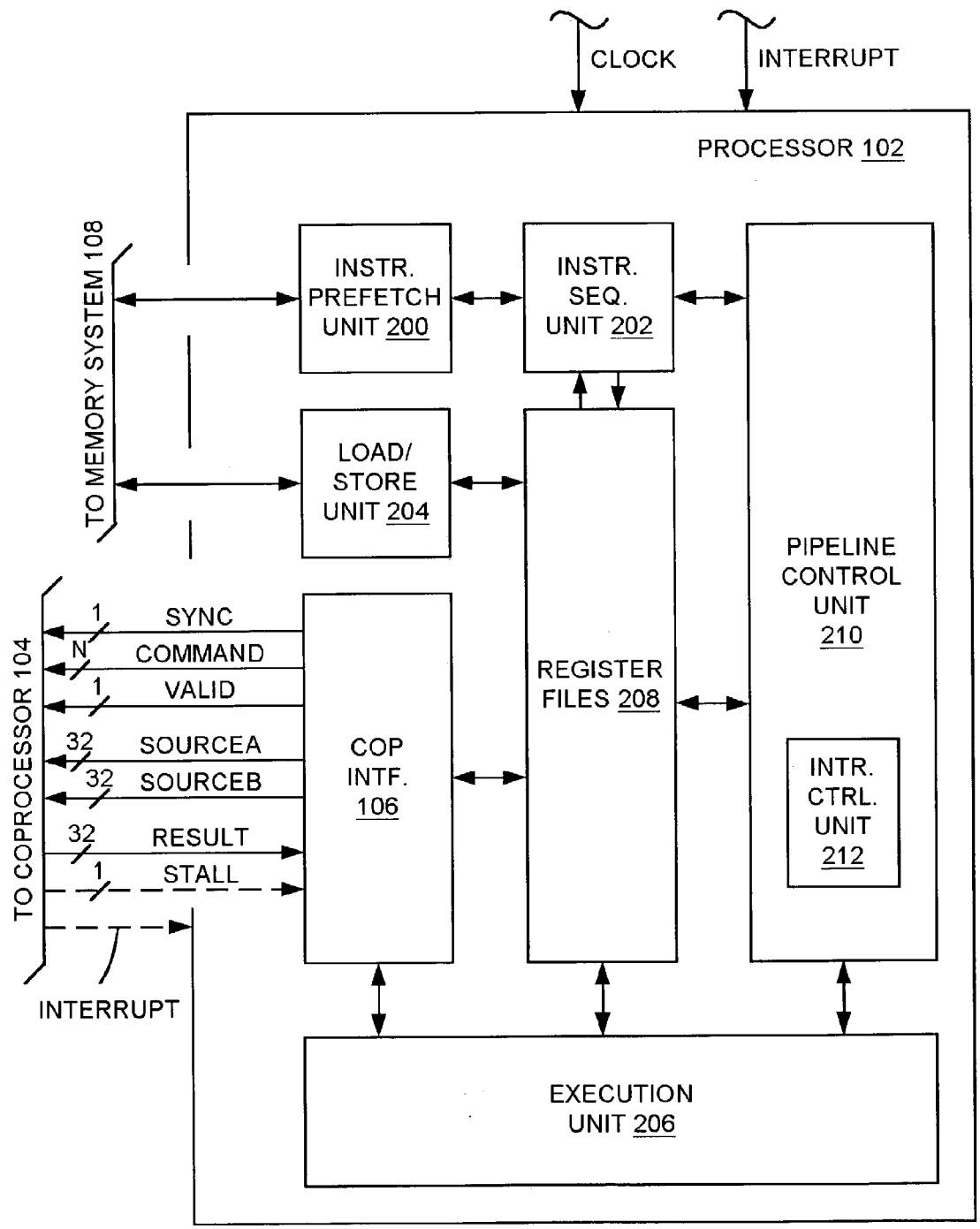
FIG. 2 is a diagram of one embodiment of the processor of FIG. 1, wherein the processor includes a pipeline control unit controlling an instruction execution pipeline.

FIG. 2 is a diagram of one embodiment of the processor 102 of FIG. 1. As indicated in FIG. 2, the processor 102 receives a clock signal "CLOCK" and executes instructions dependent upon the CLOCK signal. More specifically, the processor 102 includes several functional units described below, and operations performed within the functional units are synchronized by the CLOCK signal.

In the embodiment of FIG. 2, in addition to the coprocessor interface 106 of FIG. 1, the processor 102 includes an instruction prefetch unit 200, an instruction sequencing unit 202, a load/store unit (LSU) 204, an execution unit 206, register files 208, and a pipeline control unit 210. The instruction prefetch unit 200, the instruction sequencing unit 202, the load/store unit (LSU) 204, the execution unit 206, the register files 208, and the pipeline control unit 210 may be considered functional units of the processor 102, and may contain other functional units.

In the embodiment of FIG. 2, the processor 102 is a pipelined superscalar processor core. That is, the processor 102 implements an instruction execution pipeline including multiple pipeline stages, concurrently executes multiple instructions in different pipeline stages, and is also capable of concurrently executing multiple instructions in the same pipeline stage.

In general, the instruction prefetch unit 200 fetches instructions from the memory system 108 of FIG. 1, and provides the fetched instructions to the instruction sequencing unit 202. In one embodiment, the instruction prefetch unit 200 is capable of fetching up to 8 instructions at a time from the memory system 108, partially decodes and aligns the instructions, and stores the partially decoded and aligned instructions in an instruction cache within the instruction prefetch unit 200.

The instruction sequencing unit 202 receives (or retrieves) partially decoded instructions from the instruction cache of the instruction prefetch unit 200, fully decodes the instructions, and stores the fully decoded instructions in an instruction queue. In one embodiment, the instruction sequencing unit 202 is capable of receiving (or retrieving) multiple partially decoded instructions from the instruction cache of the instruction prefetch unit 200, and decoding the multiple partially decoded instructions, during a single cycle of the CLOCK signal.

In one embodiment, the instruction sequencing unit 202 translates instruction operation codes (i.e., opcodes) into native opcodes for the processor. The instruction sequencing unit 202 checks the multiple decoded instructions using grouping and dependency rules, and provides (i.e., issues) one or more of the decoded instructions conforming to the grouping and dependency rules as a group to the to the load/store unit (LSU) 204 and/or the execution unit 206 for simultaneous execution.

The load/store unit (LSU) 204 is used to transfer data between the processor 102 and the memory system 108. In one embodiment, the load/store unit (LSU) 204 includes 2 independent load/store units. Each of the 2 independent load/store units accesses the memory system 108 via separate load/store buses, and includes a separate address generation unit (AGU) for generating and translating address signals needed to access values stored in the memory system 108.

The execution unit 206 is used to perform operations specified by instructions (and corresponding decoded instructions). In one embodiment, the execution unit 206 includes 2 independent arithmetic logic units (ALUs), and 2 independent multiply/accumulate units (MAUs).

In general, the register files 208 include one or more register files of the processor 102. In one embodiment, the register files 208 includes an address register file and a general purpose register file. The address register file includes 8 32-bit address registers, and the general purpose register file includes 16 16-bit general purpose registers. The 16 16-bit registers of the general purpose register file can be paired to form 8 32-bit general purpose registers. The registers of the register files 208 may, for example, be accessed via read/write enable signals from the pipeline control unit 210.

In general, the pipeline control unit 210 controls an instruction execution pipeline implemented within the processor 102 and described in more detail below. In the embodiment of FIG. 2, the pipeline control unit 210 includes an interrupt control unit 212, The interrupt control unit 212 receives the INTERRUPT signal from the coprocessor 104 of FIG. 1.

In general, the interrupt control unit 212 implements a vectored priority interrupt system in which higher priority interrupts are handled (i.e., serviced) first. A non-maskable interrupt (NMI) signal has the highest priority of all the interrupt signals. In one embodiment, the interrupt control unit 212 includes a 16-bit interrupt request register having bit locations corresponding to 2 non-maskable interrupt signals and 14 maskable interrupt bit locations. The 2 non-maskable interrupt signals include the NMI signal and a device emulation interrupt (DEI) signal. When an interrupt signal is received, the corresponding bit location in the interrupt request register is set to '1'. Each bit location in the interrupt request register is cleared only when the processor 102 services the corresponding interrupt signal, or explicitly by software.

In one embodiment, the interrupt control unit 212 also includes an interrupt mask register containing mask bit locations for each of the 14 maskable interrupts. A mask bit value of '0' (i.e., a cleared bit) prevents the corresponding interrupt from being serviced (i.e., masks the corresponding interrupt signal). The INTERRUPT signal may be one of the 14 maskable interrupt signals.

In one embodiment, the interrupt control unit 212 also includes two 16-bit interrupt priority registers. Consecutive bit locations in each of the interrupt priority registers are used to store user-defined priority levels associated with the 14 maskable interrupt signals. Software programs may write to the bit locations of the interrupt priority registers. User-defined interrupt priorities may range from 0b00 (i.e., decimal '0') to 0b11 (i.e., decimal '3'), with 0b 00 being the lowest and 0b11 being the highest. (The NMI signal has a fixed priority level of decimal '5', and the DEI signal has a fixed priority level of decimal '4'.)

Once the interrupt control unit 212 decides to service an interrupt, the interrupt control unit 212 signals the instruction sequencing unit 202 of FIG. 2 to stop grouping instructions in the grouping (GR) stage of the execution pipeline. Instructions fetched and partially decoded up to and including those in the grouping (GR) stage are flushed. Executions of instructions in the operand read (RD) stage, the address generation (AG) stage, the memory access 0 (M0) stage, the memory access 1 (M1) stage, and the execution (EX) stage are completed normally before instructions of the service routine are fetched and executed.

Figure 3:
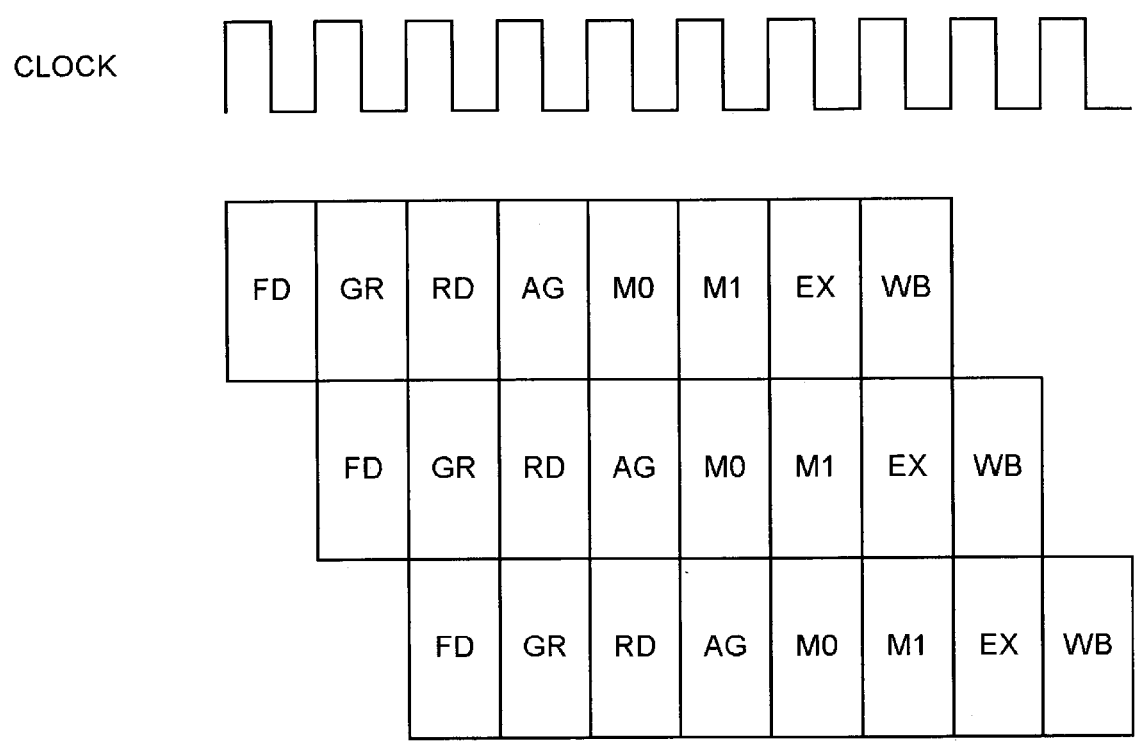
FIG. 3 is a diagram illustrating one embodiment of the instruction execution pipeline implemented within the processor of FIG. 2.

FIG. 3 is a diagram illustrating one embodiment of the instruction execution pipeline implemented within the processor 102 of FIG. 2 and controlled by the pipeline control unit 210 of FIG. 2. The instruction execution pipeline (pipeline) allows overlapped execution of multiple instructions. In the embodiment of FIG. 3, the pipeline includes 8 stages: a fetch/decode (FD) stage, a grouping (GR) stage, an operand read (RD) stage, an address generation (AG) stage, a memory access 0 (M0) stage, a memory access 1 (M1) stage, an execution (EX) stage, and a write back (WvB) stage. As indicated in FIG. 3, operations in each of the 8 pipeline stages are completed during a single cycle of the CLOCK signal.

Referring to FIGS. 1, 2, and 3, the instruction fetch unit 200 fetches several instructions (e.g., up to 8 instructions) from the memory system 108 during the fetch/decode (FD) pipeline stage, partially decodes and aligns the instructions, and provides the partially decoded instructions to the instruction sequencing unit 202. The instruction sequencing unit 202 fully decodes the instructions and stores the fully decoded instructions in an instruction queue (described more fully later). The instruction sequencing unit 202 also translates the opcodes into native opcodes for the processor.

During the grouping (GR) stage, the instruction sequencing unit 202 checks the multiple decoded instructions using grouping and dependency rules, and passes one or more of the decoded instructions conforming to the grouping and dependency rules on to the read operand (RD) stage as a group. During the read operand (RD) stage, any operand values, and/or values needed for operand address generation, for the group of decoded instructions are obtained from the register files 208.

During the address generation (AG) stage, any values needed for operand address generation are provided to the load/store unit (LSU) 204, and the load/store unit (LSU) 204 generates internal addresses of any operands located in the memory system 108. During the memory address 0 (M0) stage, the load/store unit (LSU) 204 translates the internal addresses to external memory addresses used within the memory system 108.

During the memory address 1 (M1) stage, the load/store unit (LSU) 204 uses the external memory addresses to obtain any operands located in the memory system 108. During the execution (EX) stage, the execution unit 206 uses the operands to perform operations specified by the one or more instructions of the group. During a final portion of the execution (EX) stage, valid results (including qualified results of any conditionally executed instructions) are stored in registers of the register files 208.

During the write back (WB) stage, valid results (including qualified results of any conditionally executed instructions) of store instructions, used to store data in the memory system 108 as described above, are provided to the load/store unit (LSU) 204. Such store instructions are typically used to copy values stored in registers of the register files 208 to memory locations of the memory system 108.

In one embodiment, the instruction set executable by the processor 102 of FIG. 1 includes two special types of instructions facilitating communication between the processor 102 and the coprocessor 104: "CPCOM" instructions and "CPOUT" instructions. The coprocessor instruction 112 of FIG. 1 may be, for example, a CPCOM instruction or a CPOUT instruction. In general, the CPCOM instructions are used to obtain a result from the coprocessor 104 via the RESULT signal within a certain amount of time. More specifically, the CPCOM instructions are used to obtain a result from the coprocessor 104 via the RESULT signal during pipeline execution of the CPCOM instruction as described in more detail below. Certain CPCOM instructions described below may be used to both provide data to the coprocessor 104 via the SOURCEA and SOURCEB signals, and to obtain a result from the coprocessor 104 via the RESULT signal during pipeline execution of the CPCOM instruction.

The CPOUT instructions, on the other hand, are generally used to provide data to the coprocessor 104 of FIG. 1 via the SOURCEA and SOURCEB signals of FIGS. 1 and 2. The CPOUT instructions might be used, for example, in a loosely-coupled embodiment of the data processing system 100 of FIG. 1. As described above, in such loosely coupled embodiments, the coprocessor 104 may assert the INTERRUPT signal of FIGS. 1 and 2 when the coprocessor 104 produces the result. In response to the INTERRUPT signal, the interrupt control unit 212 of FIG. 2 may initiate execution of a corresponding interrupt service routine within the processor 102 of FIGS. 1 and 2. The interrupt service routine may include a CPCOM instruction that obtains the result from the coprocessor 104 via the RESULT signal.

FIGS. 4A–5C illustrate exemplary embodiments of the coprocessor instruction 112 of FIG. 1, wherein the coprocessor instruction 112 is a CPCOM instruction or a CPOUT instruction. In the embodiments of FIGS. 4A–5C, the register files 208 of FIG. 2 includes an address register file and a general purpose register file. The address register file includes 8 32-bit address registers, and the general purpose register file includes 16 16-bit general purpose registers. The 16 16-bit registers of the general purpose register file can be paired to form 8 32-bit general purpose registers. Each of the 16 16-bit general purpose registers can be specified using 4 bits, and each of the 8 32-bit address registers and the 8 32-bit general purpose registers can be specified using 3 bits.

FIG. 4A is a diagram of one embodiment of the coprocessor instruction 112 of FIG. 1, wherein the coprocessor instruction 112 is a CPCOM instruction. In the embodiment of FIG. 4A, the coprocessor instruction 112 includes an opcode field 402, a destination register field 404, a source register 1 field 406, a source register 2 field 408, and an 8-bit user command field 410.

The opcode field 402 contains a value identifying the instruction as a CPCOM instruction, and specifying the particular embodiment of the coprocessor instruction 112 of FIG. 4A. The destination register field 404 specifies a register of the register files 208 of FIG. 2 into which a result produced by the coprocessor 104 of FIG. 1 and conveyed by the RESULT signal is to be saved.

The source register 1 field 406 specifies a register of the register files 208 of FIG. 2 containing data to be sent to the coprocessor 104 of FIG. 1 via the SOURCEA signal. The source register 2 field 408 specifies another register of the register files 208 containing data to be sent to the coprocessor 104 via the SOURCEB signal.

The 8-bit user command field 410 is used to hold an 8-bit, user-defined command to be sent to the coprocessor 104 via the COMMAND signal of FIGS. 1 and 2 (n=8). In the embodiment of FIG. 4A, the user-defined command includes 8 ordered bits, the values of which are assigned by the user. During execution of the coprocessor instruction. 112 of FIG. 4A by the processor 102 of FIG. 1, the coprocessor interface 106 of FIG. 1 drives the 8 bits of the user command field 410 on 8 corresponding signal lines conveying the COMMAND signal from the processor 102 to the coprocessor 104.

FIG. 4B is a diagram of another embodiment of the coprocessor instruction 112 of FIG. 1, wherein the coprocessor instruction 112 is a CPCOM instruction. In the embodiment of FIG. 4B, the coprocessor instruction 112 includes an opcode field 412, a source/destination register field 414, a source register field 416, and a 16-bit user command field 418.

The opcode field 412 contains a value identifying the instruction as a CPCOM instruction, and specifying the particular embodiment of the coprocessor instruction 112 FIG. 4B. The source/destination register field 414 both: (i) specifies a register of the register files 208 of FIG. 2 containing data to be sent to the coprocessor 104 of FIG. 1 via the SOURCEA signal, and (ii) specifies a register of the register files 208 of FIG. 2 into which a result produced by the coprocessor 104 of FIG. 1 and conveyed by the RESULT signal is to be saved. The source register field 416 specifies another register of the register files 208 containing data to be sent to the coprocessor 104 via the SOURCEB signal.

The 16-bit user command field 418 is used to hold a 16-bit, user-defined command to be sent to the coprocessor 104 via the COMMAND signal of FIGS. 1 and 2 (n=16). In the embodiment of FIG. 4B, the user-defined command includes 16 ordered bits, the values of which are assigned by the user. During execution of the coprocessor instruction 112 of FIG. 4B by the processor 102 of FIG. 1, the coprocessor interface 106 of FIG. 1 drives the 16 bits of the user command field 418 on 16 corresponding signal lines conveying the COMMAND signal from the processor 102 to the coprocessor 104.

FIG. 4C is a diagram of a third embodiment of the coprocessor instruction 112 of FIG. 1, wherein the coprocessor instruction 112 is a CPCOM instruction. In the embodiment of FIG. 4C, the coprocessor instruction 112 includes an opcode field 420, a destination register field 422, and a 16-bit user command field 424. The coprocessor instruction 112 of FIG. 4C is used to obtain a result from the coprocessor 104 of FIG. 1 via the RESULT signal.

The opcode field 420 contains a value identifying the instruction as a CPCOM instruction, and specifying the particular embodiment of the coprocessor instruction 112 FIG. 4C. The destination register field 422 specifies a register of the register files 208 of FIG. 2 into which a result produced by the coprocessor 104 of FIG. 1 and conveyed by the RESULT signal is to be saved.

The 16-bit user command field 424 is used to hold a 16-bit, user-defined command to be sent to the coprocessor 104 via the COMMAND signal of FIGS. 1 and 2 (n=16). In the embodiment of FIG. 4C, the user-defined command includes 16 ordered bits, the values of which are assigned by the user. During execution of the coprocessor instruction 112 of FIG. 4C by the processor 102 of FIG. 1, the coprocessor interface 106 of FIG. 1 drives the 16 bits of the user command field 424 on 16 corresponding signal lines conveying the COMMAND signal from the processor 102 to the coprocessor 104.

FIG. 5A is a diagram of one embodiment of the coprocessor instruction 112 of FIG. 1, wherein the coprocessor instruction 112 is a CPOUT instruction. In the embodiment of FIG. 5A, the coprocessor instruction 112 includes an opcode field 502, a source register 1 field 504, a source register 2 field 506, and a 16-bit user command field 508.

The opcode field 502 contains a value identifying the instruction as a CPOUT instruction, and specifying the particular embodiment of the coprocessor instruction 112 FIG. 5A. The source register 1 field 504 specifies a register of the register files 208 of FIG. 2 containing data to be sent to the coprocessor 104 of FIG. 1 via the SOURCEA signal. The source register 2 field 506 specifies another register of the register files 208 containing data to be sent to the coprocessor 104 via the SOURCEB signal.

The 16-bit user command field 508 is used to hold an 16-bit, user-defined command to be sent to the coprocessor 104 via the COMMAND signal of FIGS. 1 and 2 (n=16). In the embodiment of FIG. 5A, the user-defined command includes 16 ordered bits, the values of which are assigned by the user. During execution of the coprocessor instruction 112 of FIG. 5A by the processor 102 of FIG. 1, the coprocessor interface 106 of FIG. 1 drives the 16 bits of the user command field 508 on 16 corresponding signal lines conveying the COMMAND signal from the processor 102 to the coprocessor 104.

FIG. 5B is a diagram of another embodiment of the coprocessor instruction 112 of FIG. 1, wherein the coprocessor instruction 112 is a CPOUT instruction. In the embodiment of FIG. 5B, the coprocessor instruction 112 includes an opcode field 510, a source register field 512, and a 16-bit user command field 514.

The opcode field 510 contains a value identifying the instruction as a CPOUT instruction, and specifying the particular embodiment of the coprocessor instruction 112 FIG. 5B. The source register field 512 specifies a register of the register files 208 containing data to be sent to the coprocessor 104 via the SOURCEA signal.

The 16-bit user command field 514 is used to hold a 16-bit, user-defined command to be sent to the coprocessor 104 via the COMMAND signal of FIGS. 1 and 2 (n=16). In the embodiment of FIG. 5B, the user-defined command includes 8 ordered bits, the values of which are assigned by the user. During execution of the coprocessor instruction 112 of FIG. 5B by the processor 102 of FIG. 1, the coprocessor interface 106 of FIG. 1 drives the 16 bits of the user command field 514 on 16 corresponding signal lines conveying the COMMAND signal from the processor 102 to the coprocessor 104.

FIG. 5C is a diagram of a third embodiment of the coprocessor instruction 112 of FIG. 1, wherein the coprocessor instruction 112 is a CPOUT instruction. In the embodiment of FIG. 5C, the coprocessor instruction 112 includes an opcode field 516 and a 16-bit user command field 518. The coprocessor instruction 112 of FIG. 5C is used to send a user-defined command to the coprocessor 104 of FIG. 1 via the COMMAND signal of FIGS. 1 and 2.

The opcode field 516 contains a value identifying the instruction as a CPOUT instruction, and specifying the particular embodiment of the coprocessor instruction 112 FIG. 5C. The 16-bit user command field 518 is used to hold a 16-bit, user-defined command to be sent to the coprocessor 104 via the COMMAND signal of FIGS. 1 and 2 (n=16). In the embodiment of FIG. 5C, the user-defined command includes 16 ordered bits, the values of which are assigned by the user. During execution of the coprocessor instruction 112 of FIG. 5C by the processor 102 of FIG. 1, the coprocessor interface 106 of FIG. 1 drives the 16 bits of the user command field 518 on 16 corresponding signal lines conveying the COMMAND signal from the processor 102 to the coprocessor 104.

Figure 6:
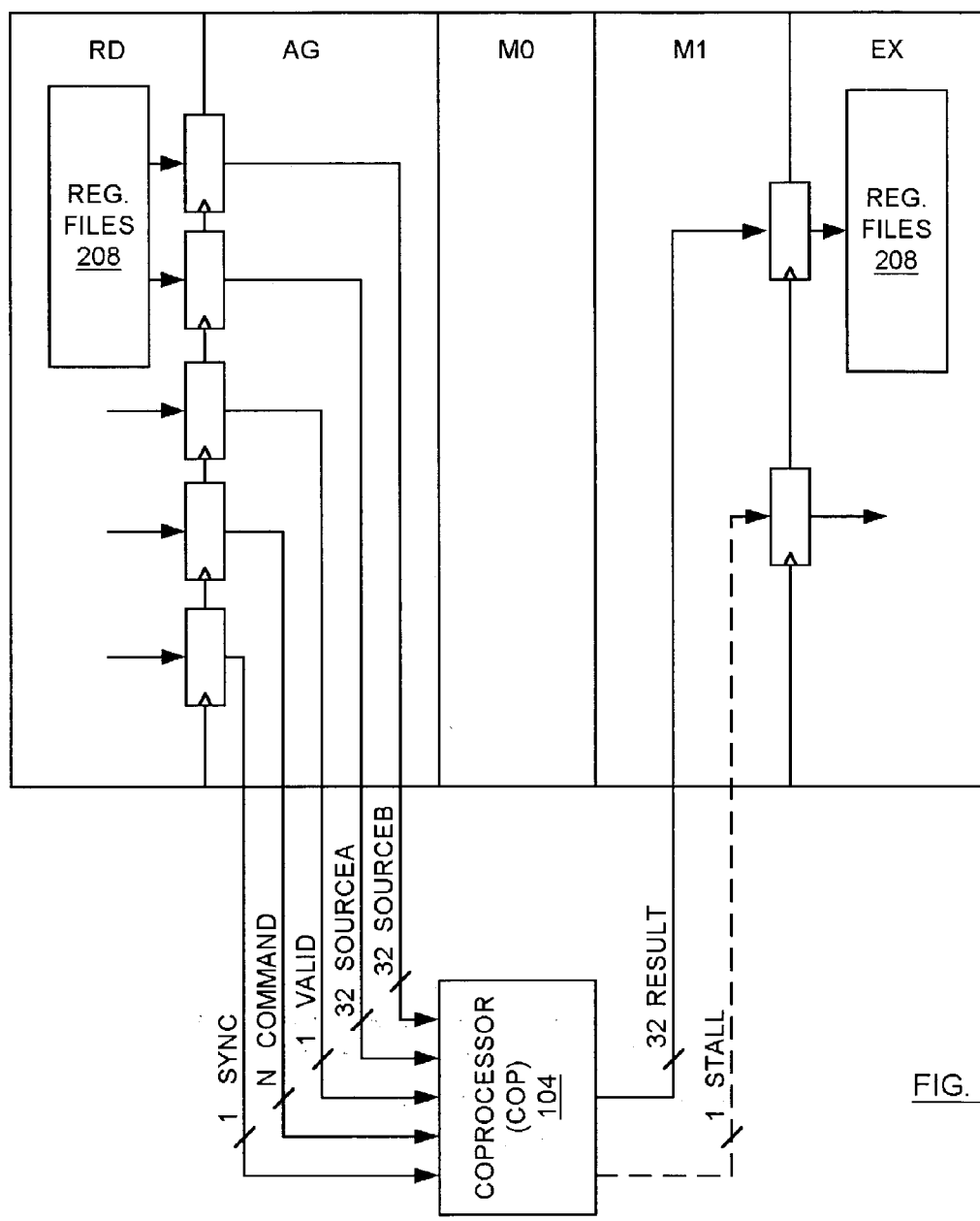
FIG. 6 is a diagram illustrating how operations of the coprocessor of FIG. 1 are synchronized with operations of the processor of FIGS. 1 and 2 during execution of the coprocessor instruction of FIG. 1.

FIG. 6 is a diagram illustrating how operations of the coprocessor 104 are synchronized with operations of the processor 102 of FIGS. 1 and 2 during execution of the coprocessor instruction 112 of FIG. 1. The execution pipeline of the processor 102, shown in FIG. 3 and described above, includes the operand read (RD), the address generation (AG), the memory address 0 (M0), the memory address 1 (M1), and the execution (EX) stages illustrated in FIG. 6.

As indicated in FIG. 6, when the coprocessor instruction 112 provides data to the coprocessor 104, values stored in registers of the register files 208 of FIG. 2 specified by source register fields of the coprocessor instruction 112 are obtained during the operand read (RD) pipeline stage, and used to generate the SOURCEA and SOURCEB signals. The SYNC, COMMAND, and VALID signals are also generated during the operand read (RD) pipeline stage. The 1-bit SYNC signals specifies whether the coprocessor instruction 112 is a CPCOM instruction or a CPOUT instruction.

At the end of the operand read (RD) stage, the generated SOURCEA, SOURCEB, SYNC, COMMAND, and VALID signals are stored in registers (i.e., "registered") as indicated in FIG. 6, and provided to the coprocessor 104 at the beginning of the address generation (AG) stage.

When the coprocessor instruction 112 of FIG. 1 is a CPCOM instruction, the coprocessor 104 is expected to generate the RESULT signal before or during the memory address 1 (M1) stage. At the end of the memory address 1 (M1) stage, the RESULT signal produced by the coprocessor 104 is registered as indicated in FIG. 6, and provided to other logic within the processor 102 at the beginning of the execution (EX) stage. During the execution (EX) stage, the processor 102 stores the result value conveyed by the RESULT signal in a register of the register files 208 of FIG. 2 specified by the destination register field of the coprocessor instruction 112 (i.e., of the CPCOM instruction).

When the coprocessor 104 is expected to generate the RESULT signal before or during the memory address 1 (M1) stage and is not able to do so, the coprocessor 104 may assert the STALL signal. In response to the STALL signal, the pipeline control unit 210 of FIG. 2 stalls the execution pipeline of the processor 102. The coprocessor 104 may continue to assert the STALL signal until the coprocessor 104 is able to generate the RESULT signal. When the coprocessor 104 deasserts the STALL signal, the pipeline control unit 210 resumes the execution pipeline, and the processor 102 stores the result value conveyed by the RESULT signal in the register of the register files 208 of FIG. 2 specified by the destination register field of the coprocessor instruction 112 of FIG. 1 (i.e., of the CPCOM instruction).

Figure 7:
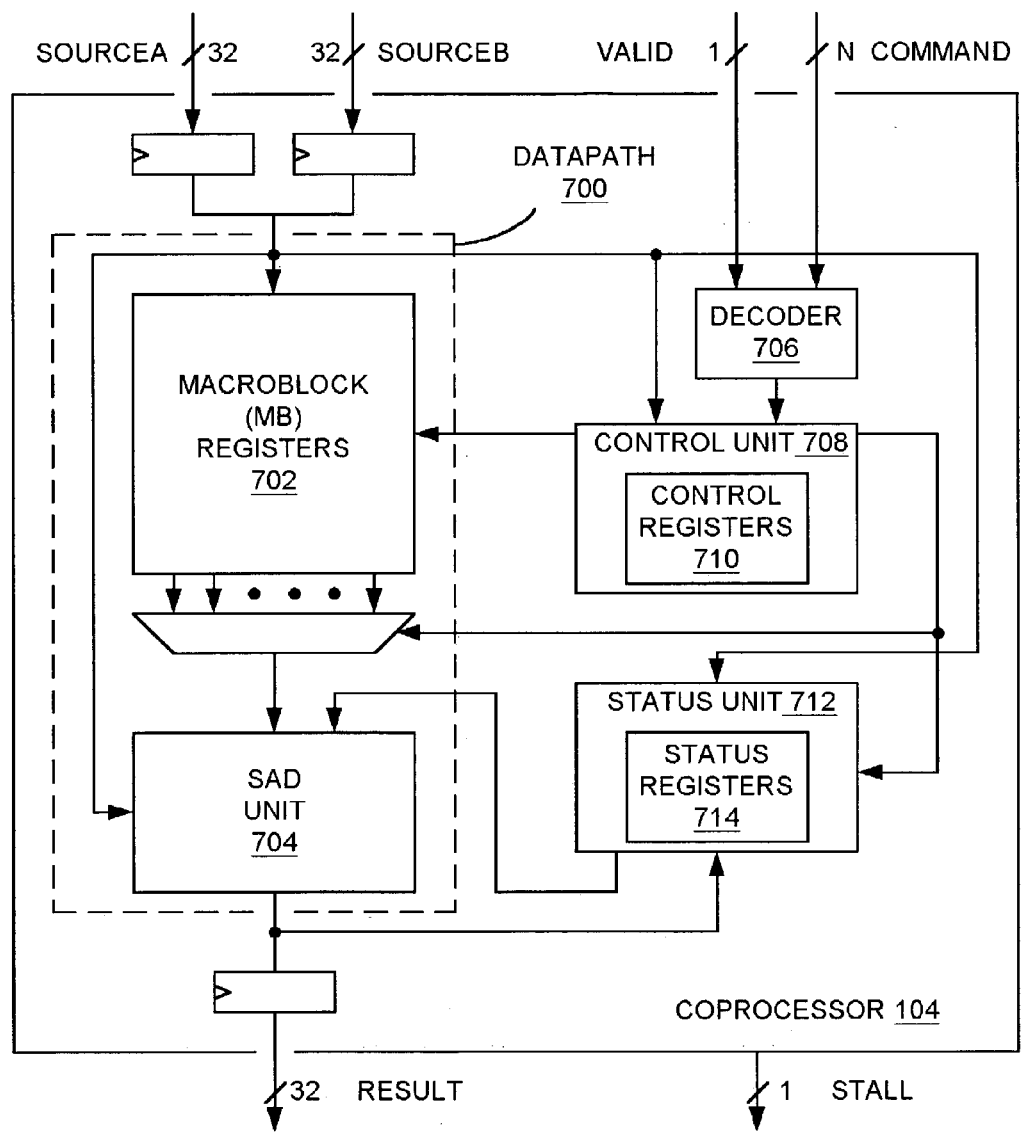
FIG. 7 is a diagram of the coprocessor of FIG. 1 wherein the coprocessor carries out a motion estimation function.

FIG. 7 is a diagram of the coprocessor 104 of FIG. 1 wherein the coprocessor 104 carries out a motion estimation function. For example, the data processing system 100 of FIG. 1 may perform an MPEG video coder/decoder (codec) function, e.g. in a video telephone (videophone) application.

In general, the computational requirements of an MPEG coder (encoder) function exceed those of an MPEG decoder function. A typical MPEG coder implements a motion estimation algorithm. The main purpose of motion estimation is to locate a most matched region between a reference search window and a current macroblock (16×16 pixels as defined by MPEG) being encoded (i.e., undergoing coding).

Many motion estimation algorithms exist, each representing a trade-off between video quality, computation complexity, and memory bandwidth. Depending on the motion estimation algorithm used, about 50 to 90 percent of the computations performed by software instructions (i.e., code) implementing the typical MPEG encoder are directed to motion estimation. (See Table 1 below.) In the embodiment of FIG. 7, the coprocessor 104 carries out a full search motion estimation algorithm with a [−16, 15] search window.

As described above, the computational requirements of the MPEG coder function exceed those of the MPEG decoder function, and the bulk of the computations performed by the typical MPEG encoder are directed to motion estimation. For example, a pixel difference criteria full search motion estimation algorithm performed on common image format (CIF) images (352 picture elements or pixels wide by 288 pixels high) at 30 frames per second requires about 1.9 billion instructions per second. In contrast, a 5 region diamond search motion estimation algorithm performed on common image format (CIF) images at 30 frames per second requires approximately 20 million instructions per second.

Certain core MPEG-4 codec functions were coded and used to estimate the computation requirements of an MPEG-4 coder/decoder (codec) implemented on a ZSP500 digital signal processor (LSI Logic Corporation, Milpitas, Calif.). The computational requirements were measured in million cycles per second, or MCPS. Table 1 lists the results based on quarter common intermediate format (QCIF) images (176×144 pixels) at 15 frames per second.

TABLE 1

Estimated Computation Requirements of MPEG-4 Codec Implemented on ZSP500 DSP.

| Function | MCPS |
|---|---|
| Encoder without Motion Estimation | 29.7 |
| Decoder | 9.4 |
| Motion Estimation | 193.5 |
| Total | 232.6 |

The results in Table 1 agree with the above description that motion estimation is the most computationally demanding and time consuming task of an MPEG video codec.

Among the different algorithms and MPEG profiles and levels, the motion estimation generally involves: (i) computing one motion vector over a 16×16 pixel macroblock, (ii) computing four motion vectors over four 8×8 pixel blocks, integer pixel or ½, or ¼ pixel precision, and (iii) determining an alpha plane for shape coding. It is noted that in the embodiment of FIG. 7, the coprocessor 104 does not evaluate shape coding, and does not handle half or ¼ pixel (pel) precision levels.

It is noted that although only the handling of quarter common intermediate format (QCIF) images is described herein, the advantages of the configuration of the coprocessor 104 of FIG. 7 are even greater with larger picture sizes.

A detailed analysis of the full search motion estimation algorithm implemented on a ZSP500 digital signal processor (DSP) was performed, and the results are listed in Table 2 below.

TABLE 2

Motion Estimation Detailed Analysis Results.

| Operation | MCPS | Fraction |
|---|---|---|
| SAD (16 × 16 & 8 × 8) | 160.5 | 83.0 |
| Find Half Pel | 19.4 | 10.0 |
| Interpolate Image | 5.0 | 2.6 |
| Others (Control etc.) | 8.6 | 4.4 |

The results in Table 2 show that most of the time spent in motion estimation is calculating the sum of absolute difference (SAD) calculations involving the macroblocks (16×16 pixels) in the search range and the current macroblock. For a full search, this SAD comparison is performed 256 times per macroblock. A quarter common intermediate format (QCIF) image has 99 macroblocks, so the SAD operation is performed up to 25,344 times per each predictive picture. With motion estimation taking up about 83 percent of the total computational requirements, it would be advantageous to provide hardware acceleration for motion estimation and free up the processor 102 of FIG. 1 to perform other functions.

There may be various ways to implement a cost effective solution. For example, a less complex motion estimation algorithm could be used. Alternately, a hardware accelerator could be employed. Further, a combination of hardware and software could be used.

As described above, a full search for motion estimation requires 256 sum of absolute difference (SAD) comparisons against every macroblock of the current frame. In the embodiment of FIG. 7, the coprocessor 104 includes a datapath 700 including a sum of absolute difference (SAD) unit 704 for performing sum of absolute difference (SAD) calculations of the motion estimation algorithm. As a result, the processor 102 of FIG. 1 is spared a significant computational load. Further, the processor 102 and the coprocessor 104 cooperate to efficiently perform both single motion vector searches for the full macroblock and multiple motion vectors over the four 8×8 blocks.

In the embodiment of FIG. 7, the coprocessor 104 includes macroblock (MB) registers 702 for storing a complete current macroblock (i.e., a macroblock undergoing encoding) in the coprocessor 104. The macroblock (MB) registers 702 forms a 16-byte×16-byte array. Storing a complete current macroblock reduces a number of data memory accesses and an amount of data transferred between the processor 102 of FIG. 1 and coprocessor 104 by almost 50 percent, leading to lower power dissipation.

In the embodiment of FIG. 7, each MPEG pixel is represented by 8 bits, and coprocessor 104 of FIG. 7 advantageously stores and operates on 8-bit data units (i.e., bytes). Each of the macroblock registers 702 is an 8-bit register. In contrast, many modern processors have 16-bit registers. In order to avoid the computational performance penalty associated with packing and unpacking 8-bit bytes in 16-bit registers, software embodiments of motion estimation algorithms implemented using processors having 16-bit registers often store each 8-bit pixel in a separate 16-bit register. In this situation, twice as many registers are required. Further, when the software embodiment is modified to facilitate a processor-coprocessor system such as the data processing system of FIG. 1, only 8 bits of every 16 bits of data transferred between the processor and the coprocessor may be valid data. In this situation, a required data bandwidth between the processor and the coprocessor is doubled.

In view of the above, configuring the coprocessor 104 of FIG. 7 to store and operate on 8-bit data bytes potentially reduces a required data bandwidth between processor 102 of FIG. 1 and the coprocessor 104. Further, the required data bandwidth is reduced by the coprocessor 104 having a sufficient number of internal registers (e.g., macroblock registers 702) to store a complete macroblock (16×16 pixels) of data.

Commands and data are sent to coprocessor 104 of FIG. 7 during the address generation (AG) stage of the instruction execution pipeline of the processor 102 of FIG. 1. The user-defined commands for the coprocessor 104 of FIG. 7 are listed in Table 3 below. As described above, the user-defined commands include multiple ordered bits having values assigned by the user.

TABLE 3

User Defined Commands for the Coprocessor 104 of FIG. 7.

| Command | Type | Description |
| --- | --- | --- |
| CP_ME_SETUP | CPOUT | Reset the coprocessor 104. |
| CP_ME_CR_WR | CPOUT | Write data to control registers 710. |
| CP_ME_BLK_WR | CPOUT | Write data to 8 adjacent 8-bit registers of macroblock (MB) registers 702 pointed to by MB write pointer of control registers 710, and update MB write pointer to next set of 8 registers. |
| CP_ME_PSAD8_8 | CPOUT | Perform a partial sum of absolute difference (SAD) operation for 8 × 8-pixel block. |
| CP_ME_PSAD8_16 | CPOUT | Perform a partial sum of absolute difference (SAD) operation for 16 × 16-pixel macroblock. |
| CP_ME_SAD8_RD | CPCOM | Resolve and return final sum of absolute difference (SAD) value for 8 × 8-pixel block. |
| CP_ME_SAD16_RD | CPCOM | Resolve and return final sum of absolute difference (SAD) value for a 16 × 16-pixel macroblock. |
| CP_ME_COND | CPCOM | Calculate condition (based on internal registers of the coprocessor 104 and transferred data). |

The partial sum of absolute difference (SAD) operation performed in response to the CP_ME_PSAD8_8 command accumulates 8 partial SAD results for a SAD operation performed on the 8 sets of 8 bytes of one of the four 8×8-pixel blocks stored in the 16-byte-by-16-byte register array of the macroblock registers 702. Each of the 8 partial SAD results is computed as:

Partial SAD result=$[(b7x-b7y)]+[(b6x-b6y)]+ \ldots +[(b0x-b0y)]$ where bnx is a byte n of an 8-byte set x, bny is a byte n of an 8-byte set y, set x is from the macroblock registers 702, and set y is from data present on the SOURCEA and SOURCEB buses.

The partial sum of absolute difference (SAD) operation performed in response to the CP_ME_PSAD8_16 command accumulates the 32 partial SAD results for the above SAD operation performed on the four 8×8-pixel blocks stored in the 16-byte-by-16-byte register array of the macroblock registers 702. Each partial SAD result is computed as described above.

In a "resolve final sum of absolute difference (SAD)" operation performed in response to the CP_ME_SAD8_RD command, the partial SAD result obtained for an 8×8-pixel block of the macroblock registers 702 is saturated against a constant maximum value and compared to a variable minimum value. The minimum value result of the "resolve final sum of absolute difference (SAD)" operation is returned.

In a "resolve final sum of absolute difference (SAD)" operation performed in response to the CP_ME_SAD16_RD command, the accumulated 32 partial SAD results obtained for the four 8×8-pixel blocks of the macroblock registers 702 is saturated against a constant maximum value and compared to a variable minimum value.

The minimum value result of the "resolve final sum of absolute difference (SAD)" operation is returned.

In the embodiment of FIG. 7, the coprocessor 104 also includes a decoder 706, a control unit 708 including control registers 710, and a status unit 712 including status registers 714. When the decoder 706 receives a valid COMMAND signal indicating corresponding source data, the coprocessor 104 registers the two 32-bit source operands conveyed by the SOURCEA and SOURCEB signals. The decoder 706 decodes the user-defined command conveyed by the COMMAND signal, and updates pointers and the control registers 710 of the control unit 708. Depending on the command issued to the coprocessor 104, the source data is used (e.g., during a subsequent cycle of a clock signal) to: (i) update the macroblock registers 702, (ii) modify the control registers 710 and/or the status registers 714, or (iii) perform a partial, eight-byte sum of absolute difference (SAD) comparison involving data in the current Macroblock registers 702.

When a partial sum of absolute difference (SAD) comparison is performed, the coprocessor 104 of FIG. 7 internally stores an accumulated SAD value in one of the status registers 714. When a final partial SAD operation is completed, a final saturated SAD value is read from the coprocessor 104 using either the CP_ME_SAD8_RD or CP_ME_SAD16_RD user-defined command.

The control registers 710 are used to store values called pointers that direct the reading and writing of the macroblock registers 702. Contents of other control registers of the control registers 710 are used to control the datapath 700 and the updating of the status registers 714. For example, In the embodiment of FIG. 7, the processor 102 sends the coprocessor 104 data 8 bytes at a time. Filling the 16-byte-by-16-byte register array of the macroblock registers 702 with data requires 32 write transactions. A macroblock write pointer of the control registers 710 indicates (i.e., points to) 8 consecutive registers of the macroblock registers 702 to which 8 bytes of data is either currently being written or is to be written.

The status registers 714 include a first 16-bit register used to store the accumulated SAD value for a given macroblock or block comparison, and a second 16-bit register used to store the final saturated SAD value (that has been resolved and saturated from the temporary value).

When a sum of absolute difference (SAD) comparison between two macroblocks (or two blocks) has been completed, the accumulated SAD value is compared against a minimum value and provided to the processor 102 of FIG. 1 via the RESULT signal.

The following is pseudo code representation of motion estimation for a full macroblock (16×16 pixels) using the user-defined commands listed in Table 3 above:

```
CP_ME_CR_WR(CP_BLK_DW_PTR,0);   // write to coprocessor internal control
                                   register
LOOP_LD(32) {                    // load current 16×16 macroblock
                                   into coprocessor
    load SRC0, CurFrm++          // load 4*8 bit from data memory
    load SRC1, CurFrm++          // load 4*8 bit from data memory
    cpout(CP_ME_BLK_WR,SRC0, SRC1)  //transfer 64 bit to coprocessor
}
...
LOOP_SR(X-range * Y-range) {     // iterate over full search range
    ...
    cpout(CP_ME_SETUP)           // setup coprocessor
                                   for this iteration
    LOOP_MB(32) {                // 32 8-byte SAD comparisons per MB
        load SRC0, RefPtr++      // load 4*8 bit from data memory
        load SRC1, RefPtr++      // load 4*8 bit from data memory
        cpout(CP_ME_PSAD8_16, SRC0,SRC1)     // partial SAD operation
    }
    SAD = cpcom(CP_ME_SAD16_RD, SAD_minval)  // calculate final SAD result
    COND = cpcom(CP_ME_COND, RefPtr, MV)
    if (COND) {...}         // update status registers
}
```

Computational requirements were estimated for a ZSP500 digital signal processor (DSP) where the ZSP500 DSP and the coprocessor 104 of FIG. 7 implement an MPEG-4 codec. The computational requirements were measured in million cycles per second (MCPS). Table 4 lists the results based on quarter common intermediate format (QCIF) images (176× 144 pixels) at 15 frames per second.

TABLE 4

Estimated Computation Requirements of ZSP500 DSP Where ZSP500 DSP and the Coprocessor 104 of FIG. 7 Implement an MPEG-4 Codec.

| Function | MCPS |
| --- | --- |
| Encoder w/o motion estimation | 29.7 |
| Decoder | 9.4 |
| Motion estimation | 46.9 |
| Total | 86.0 |

The results in Table 4 show that the coprocessor 104 of FIG. 7 reduces the processing bandwidth requirements of the processor 102 by 63 percent, from 232.6 million cycles per second (MCPS), required by a software solution, to 86 MCPS required by the processor 102 working cooperatively with the coprocessor 104.

A detailed analysis of the full search motion estimation algorithm implemented on the coprocessor 104 of FIG. 7 was performed, and the results are listed in Table 5 below.

TABLE 5

Results for Motion Estimation Using Coprocessor 104 of FIG. 7.

| Function | MCPS | Fraction |
|---|---|---|
| SAD (16 × 16 & 8 × 8) | 13.9 | 29.6 |
| Find Half Pel | 19.4 | 41.4 |
| Interpolate Image | 5.0 | 10.7 |
| Other (Control etc.) | 8.6 | 18.3 |

Figure 8:
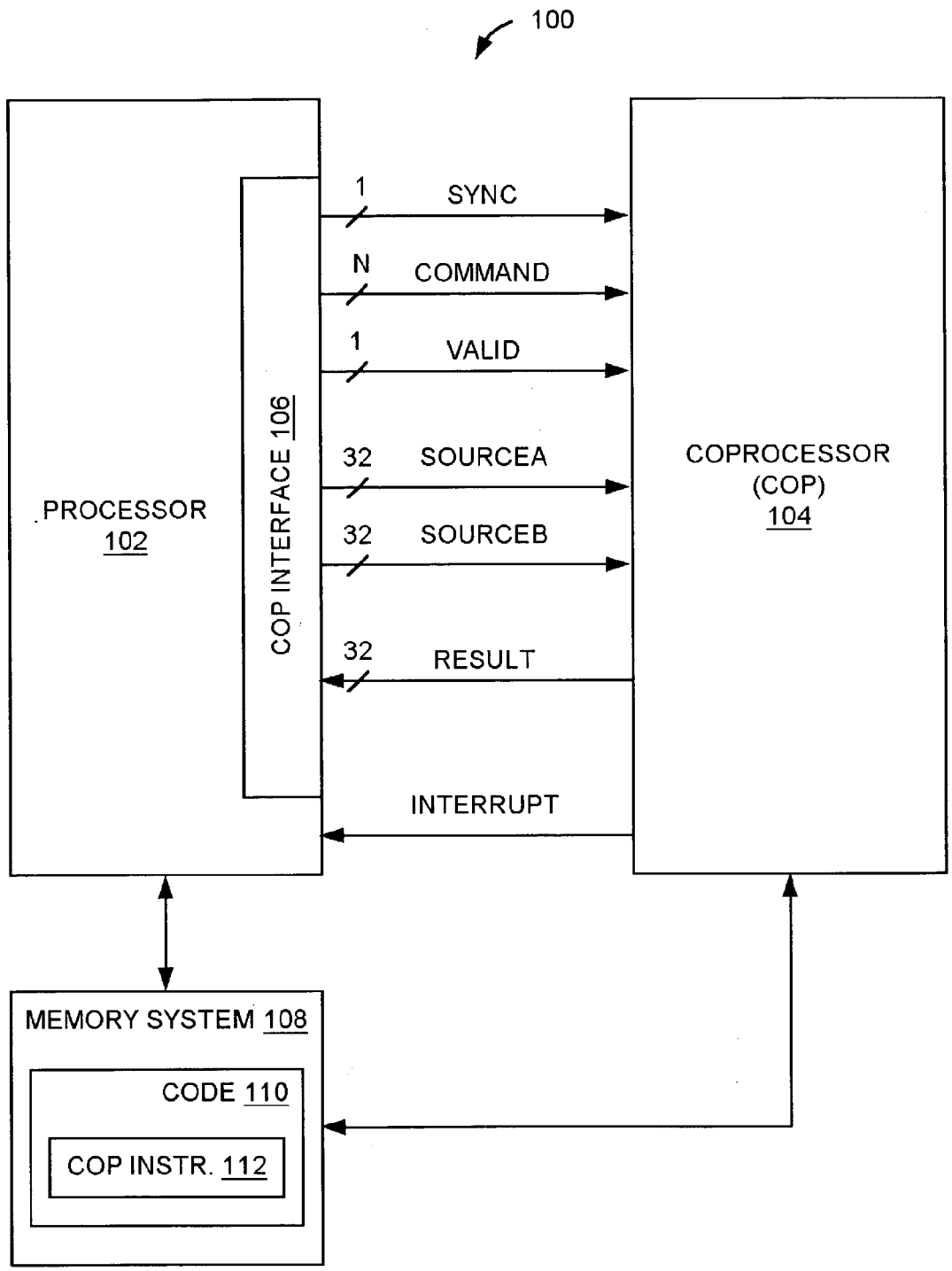
FIG. 8 is a diagram of one embodiment of the data processing system of FIG. 1 wherein the processor and the coprocessor are loosely coupled.

FIG. 8 is a diagram of one embodiment of the data processing system 100 of FIG. 1 wherein the processor 102 and the coprocessor 104 are loosely coupled. In the embodiment of FIG. 8, the coprocessor 104 is coupled to the memory system 108, and accesses the memory system 108 directly.

In the embodiment of FIG. 8, the processor 102 executes a software application program wherein the coprocessor instruction 112 is a CPOUT instruction. The coprocessor instruction 112 (i.e., the CPOUT instruction) causes the processor 102 to provide a command and/or data to the coprocessor 104 via the COMMAND and SOURCEA and SOURCEB signals. In general, the processor 102 does not expect the coprocessor 104 to produce a result, and to generate the RESULT signal, within a certain amount of time.

When the coprocessor 104 produces a result, the coprocessor 104 asserts the INTERRUPT signal. In response to the INTERRUPT signal, the interrupt control unit 212 of FIG. 2 initiates execution of a corresponding interrupt service routine within the processor 102. The interrupt service routine includes a CPCOM instruction that obtains the result from the coprocessor 104 via the RESULT signal. It is noted that in the loosely-coupled embodiment of FIG. 8, the STALL signal of FIGS. 1 and 2 is not used.

Figure 9:
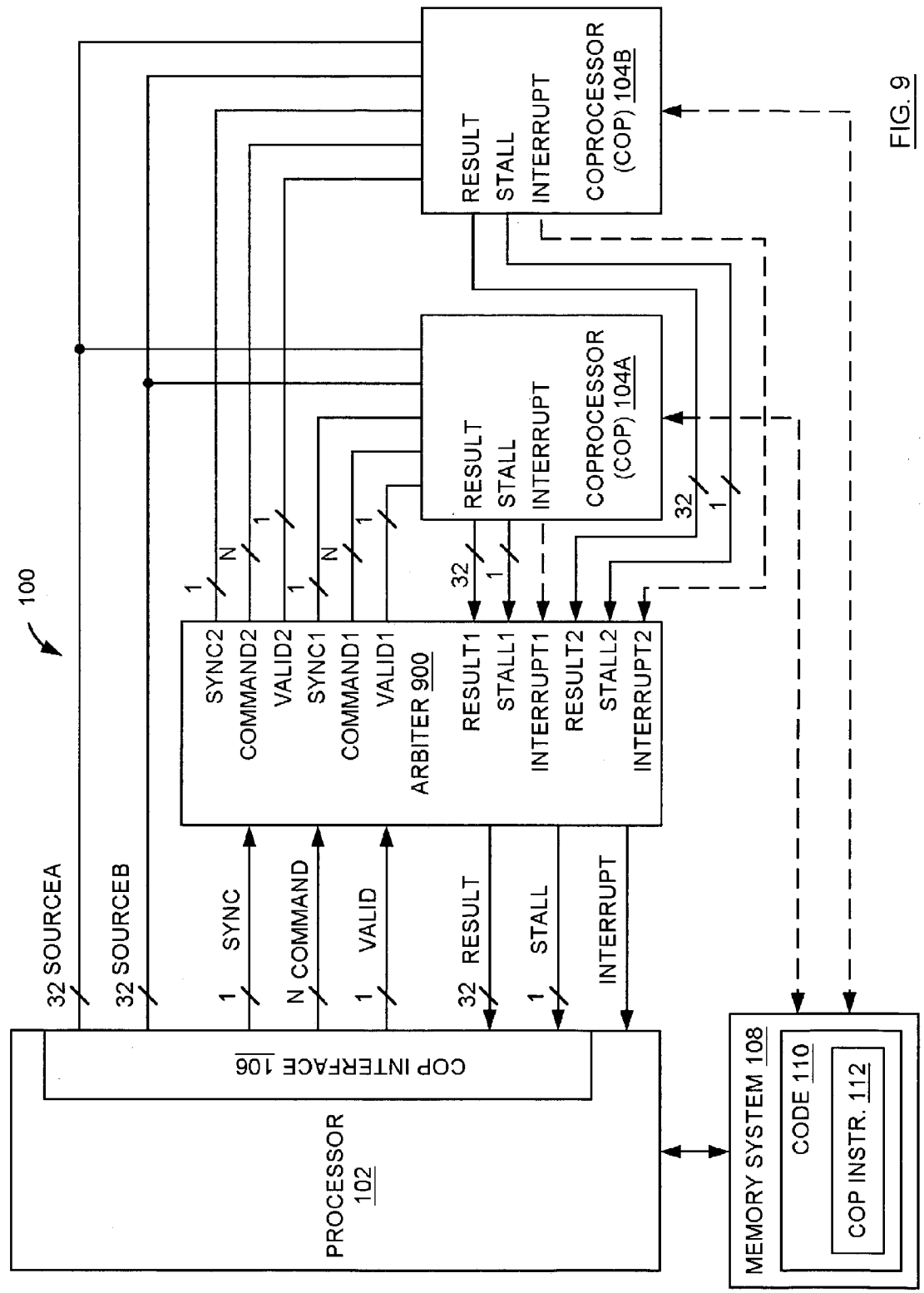
FIG. 9 is a diagram of a multi-coprocessor embodiment of the data processing system of FIG. 1 wherein the processor is coupled to multiple coprocessors via an arbiter.

FIG. 9 is a diagram of a multi-coprocessor embodiment of the data processing system 100 of FIG. 1. In the embodiment of FIG. 9, the processor 102 is coupled to a first coprocessor 104A and a second coprocessor 104B via an arbiter 900. In general, the processor 102 communicates with the first coprocessor 104A and the second coprocessor 104B via the arbiter 900. As indicated in FIG. 9, either one of the coprocessors 104 may be coupled to the memory system 108, and access the memory system 108 directly.

In the embodiment of FIG. 9, the processor 102 to provides the SOURCEA and SOURCEB signals to both the first coprocessor 104A and a second coprocessor 104B, and provides the SYNC, COMMAND, and VALID signals to the arbiter 900. Each of the n-bit, user-defined commands specifies whether the command is directed to the first coprocessor 104A, or to the second coprocessor 104B. The arbiter 900 routes the SYNC, COMMAND, and VALID signals received from the processor 102 to either the first coprocessor 104A or the second coprocessor 104B dependent upon the user-defined command conveyed by a valid COMMAND signal received from the processor 102.

For example, in the embodiment of FIG. 9, when a user-defined command conveyed by a valid COMMAND signal indicates that the command is directed to the first coprocessor 104A, the arbiter 900 produces the SYNC signal received from the processor 102 as the SYNC1 signal, produces the COMMAND signal received from the processor 102 as the COMMAND1 signal, and produces the VALID signal received from the processor 102 as the VALID 1 signal. As indicated in FIG. 9, the first coprocessor 104A is coupled to receive the SYNC1, COMMAND1, and VALID1 signals from the arbiter 900. The second coprocessor 104B is coupled to receive SYNC2, COMMAND2, and VALID2 signals from the arbiter 900.

In general, the coprocessors 104 of FIG. 9 may be tightly coupled or loosely coupled to the processor 102. When one of the coprocessors 104 is tightly coupled to the processor 102, the processor 102 expects the coprocessor 104 to produce a result, and to provide the result via the RESULT signal, within a certain amount of time.

When one of the coprocessors 104 is tightly coupled to the processor 102, the arbiter 900 receives the RESULTx signal from the tightly-coupled coprocessor 104 (x=1 or 2), and provides the RESULTx signal to the processor 102 as the RESULT signal.

In the event the tightly-coupled coprocessor 104 is not able to generate the RESULT signal within the allotted time (e.g., before or during the memory address 1 or M1 stage of the execution of a CPCOM coprocessor instruction 112 within the processor 102), the tightly-coupled coprocessor 104 asserts the STALLx signal (x=1 or 2). The arbiter 900 receives the STALLx signal from the tightly-coupled coprocessor 104, and provides the STALLx signal to the processor 102 as the STALL signal. The pipeline control unit 210 of FIG. 2 responds to the STALL signal as described above.

When one of the coprocessors 104 of FIG. 9 is loosely coupled to the processor 102, the processor 102 does not expect the coprocessor 104 to produce a result, and to provide the result via the RESULT signal, within a certain amount of time.

When one of the coprocessors 104 is loosely coupled to the processor 102 and generates the RESULT signal, the loosely-coupled coprocessor 104 asserts the INTERRUPTx signal (x=1 or 2). The arbiter 900 receives the asserted INTERRUPTx signal from the loosely-coupled coprocessor 104, and provides the INTERRUPTx signal to the processor 102 as the INTERRUPT signal. The interrupt control unit 212 of FIG. 2 responds to the INTERRUPT signal as described above.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What we claim as our invention is:

1. A processor interface configured to couple a processor to a coprocessor and allow said processor to signal said coprocessor to operate in a selected one of a tightly-coupled mode and a loosely-coupled mode based on a received program instruction, wherein said coprocessor signals said processor interface to stall a pipeline of said processor when said coprocessor is in said tightly-coupled mode, and a result from said coprocessor is unavailable.

2. The processor interface as recited in claim 1, wherein said coprocessor provides an interrupt to said processor to signal availability of a result when said coprocessor interface is in said loosely-coupled mode.

3. The processor interface as recited in claim 1, wherein said coprocessor depends on said processor to provide data from a memory system when said coprocessor interface is in said tightly-coupled mode.

4. The processor interface as recited in claim 1, wherein said coprocessor directly accesses a memory system when said coprocessor interface is in said loosely-coupled mode.

5. The processor interface as recited in claim 1, wherein said coprocessor is configured to perform a motion estimation function.

6. The processor interface as recited in claim 1, wherein said processor interface couples a plurality of coprocessors to said processor.

7. A method of interfacing a processor to a coprocessor, wherein said processor signals said coprocessor to operate in a selected one of a tightly-coupled mode and a loosely-coupled mode based on a received program instruction, wherein said coprocessor signals said processor interface to stall a pipeline of said processor when said coprocessor is in said tightly-coupled mode, and a result from said coprocessor is unavailable.

8. The method as recited in claim 7, wherein said coprocessor provides an interrupt to said processor to signal availability of a result when said coprocessor interface is in said loosely-coupled mode.

9. The method as recited in claim 7, wherein said coprocessor depends on said processor to provide data from a memory system when said tightly-coupled mode is selected.

10. The method as recited in claim 7, wherein said coprocessor directly accesses a memory system when said loosely-coupled mode is selected.

11. The method as recited in claim 7, wherein said coprocessor is configured to perform a motion estimation function.

12. The method as recited in claim 7, wherein said processor interface couples a plurality of coprocessors to said processor.

13. A data processing system, comprising:
a processor;
a coprocessor; and
a processor interface configured to couple a processor to a coprocessor and allow said processor to signal said coprocessor to operate in a selected one of a tightly-coupled mode and a loosely-coupled mode based on a received program instruction, wherein said coprocessor signals said processor interface to stall a pipeline of said processor when said coprocessor is in said tightly-coupled mode, and a result from said coprocessor is unavailable.

14. The data processing system as recited in claim 13, wherein said coprocessor provides an interrupt to said processor to signal availability of a result when said coprocessor interface is in said loosely-coupled made.

15. The data processing system as recited in claim 13, further comprising a memory system, wherein said coprocessor depends on said processor to provide data from said memory system when said coprocessor interface is in said tightly-coupled mode.

16. The data processing system as recited in claim 13, further comprising a memory system, wherein said coprocessor directly accesses said memory system when said coprocessor interface is in said loosely-coupled mode.

17. The data processing system as recited in claim 13, wherein said coprocessor is configured to perform a motion estimation function.

18. The data processing system as recited in claim 13, wherein said processor interface couples a plurality of coprocessors to said processor.

* * * * *